United States Patent [19]

Brothers

[11] 4,209,164

[45] Jun. 24, 1980

[54] TOOL FOR USE IN CONSTRUCTING PANELED ORNAMENTS

[76] Inventor: Alvin O. Brothers, 2001 E. Franklin St., Evansville, Ind. 47711

[21] Appl. No.: 932,471

[22] Filed: Aug. 10, 1978

[51] Int. Cl.² .............................................. B25B 1/20
[52] U.S. Cl. .................................... 269/37; 269/239; 269/307
[58] Field of Search ...................... 108/6, 7; 5/61, 62; 33/174 S, 174 TA, 174 TC; 269/321 N, 289 R, 296, 307, 239, 155, 37

[56] References Cited

U.S. PATENT DOCUMENTS

| 149,255 | 3/1874 | Semmendinger | 108/7 |
|---------|--------|--------------|-------|
| 2,452,426 | 10/1948 | Blaske | 269/307 |
| 3,432,934 | 3/1969 | Schmidt | 33/174 S |
| 3,974,571 | 8/1976 | LaPierre | 33/174 S |

*Primary Examiner*—Robert C. Watson
*Attorney, Agent, or Firm*—Jenkins, Coffey, Hyland, Badger & Conrad

[57] ABSTRACT

A solder jig for use in constructing "stained glass" ornaments and the like having panels disposed at selected angles with respect to one another. The jig is useful in constructing ornaments by either the lead came method, or the Tiffany (copper foil) method. The jig includes a base having a flat top surface and support legs. The base provides a pair of threaded holes receiving adjustment bolts. Locking wing nuts are provided on the adjustment bolts. The heads of the adjustment bolts are equipped with bar-shaped supports. Each support includes a generally flat horizontally extending portion and a generally flat portion making an angle of approximately 140° with the horizontal portion. The base also provides locating pins which protrude upwardly generally vertically from the top surface of the base. A pair of work surface providing members are notched to engage the locating pins and rest upon the supports. The adjacent edges of the work surface providing members intersect at a predetermined, selectively variable angle which corresponds to the angle to be formed between two panels of the ornament. This structure thereby holds pairs of such panels in predetermined angular orientations with respect to one another while they are joined, e.g., by soldering the copper foil or lead came provided around their perimeters.

15 Claims, 9 Drawing Figures

U.S. Patent  Jun. 24, 1980  Sheet 1 of 4  4,209,164
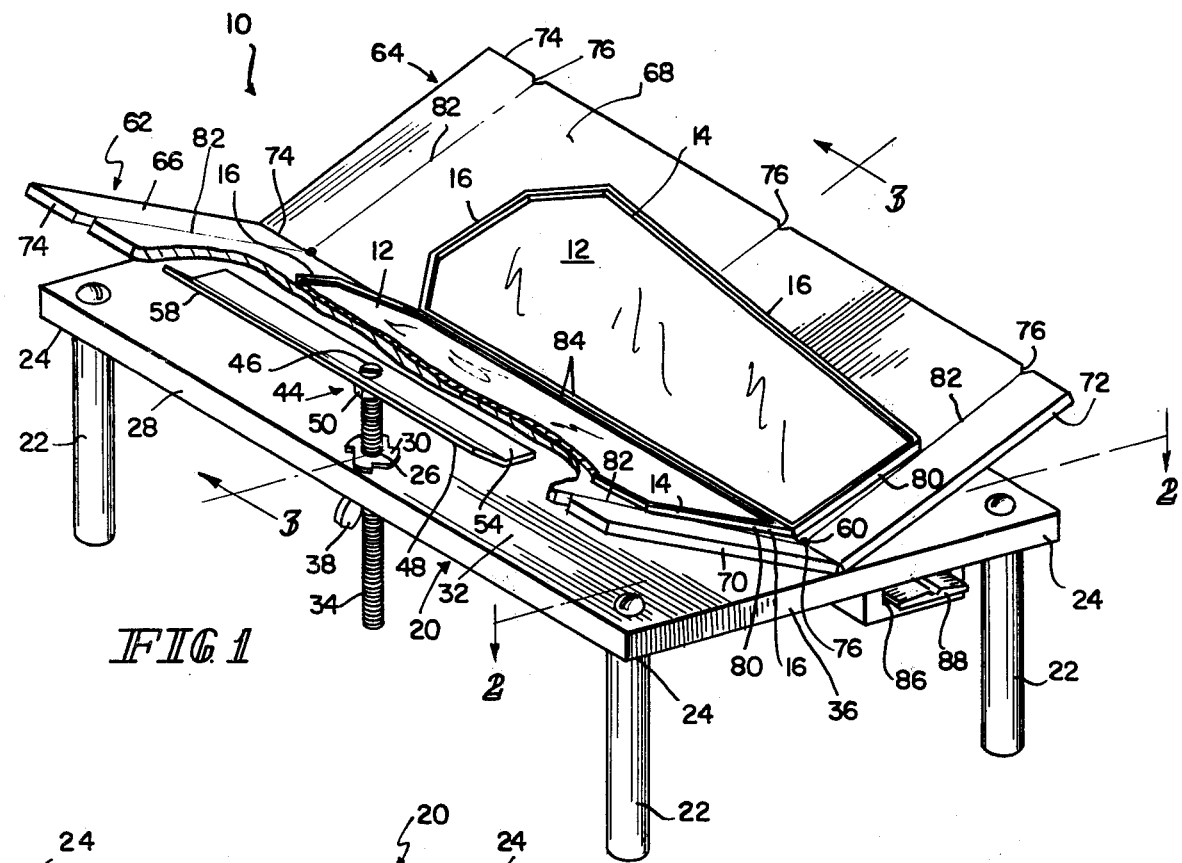
FIG. 1
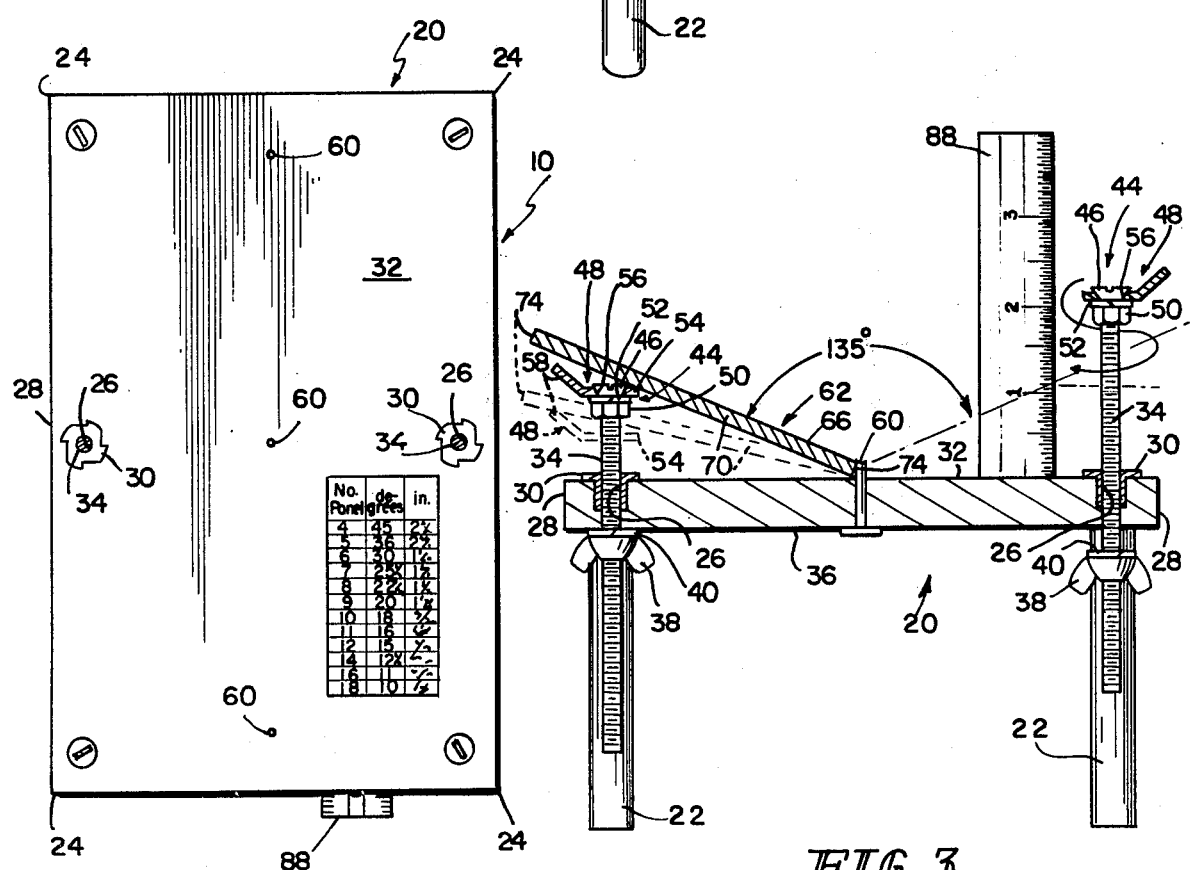
FIG. 2
FIG. 3

U.S. Patent Jun. 24, 1980 Sheet 4 of 4 4,209,164
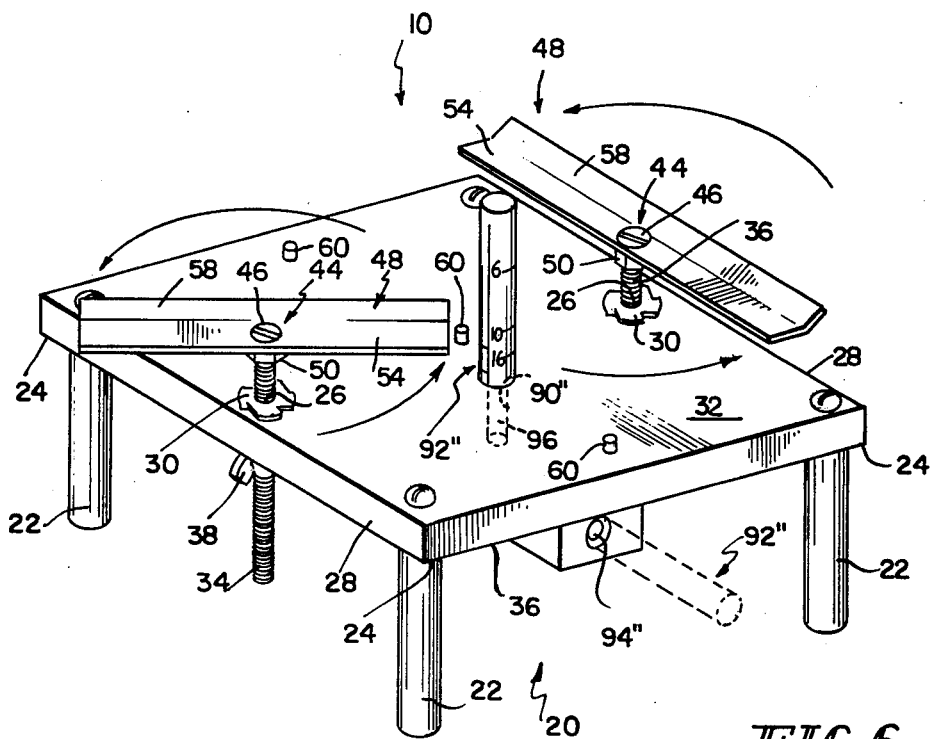
FIG. 6
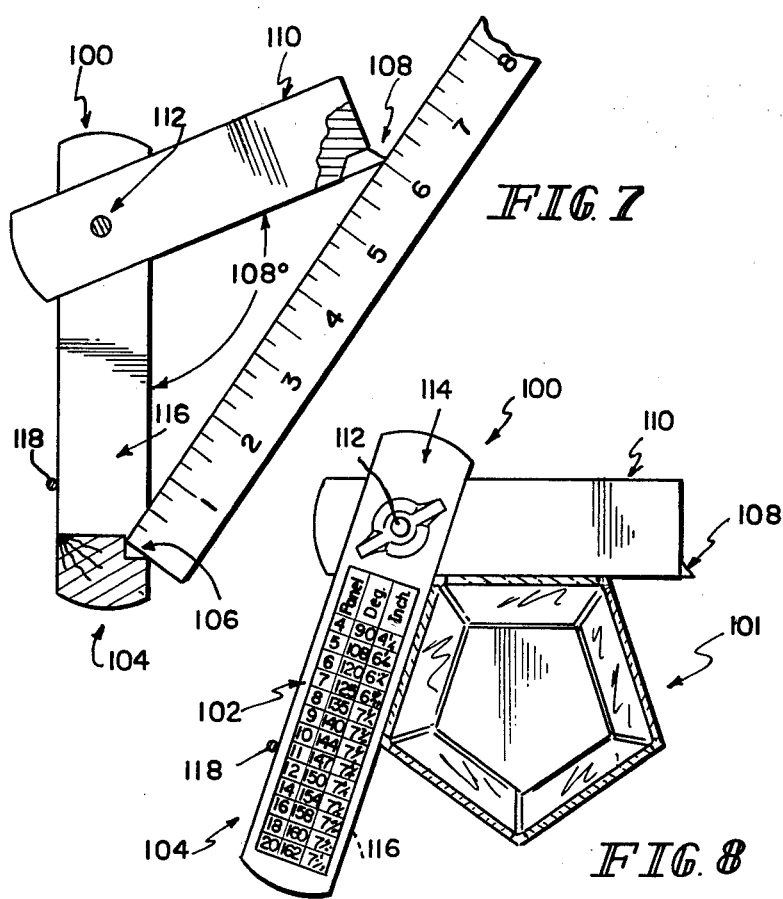
FIG. 7
FIG. 8

TOOL FOR USE IN CONSTRUCTING PANELED ORNAMENTS

This invention relates to tools, and particularly to a solder jig for use in constructing ornaments and the like, such as "stained glass" ornaments having panels disposed at selected angles with respect to one another.

Working with small sheets or panels of glass in varied colors, called "stained glass," has become a popular hobby. There are basically two methods by which small cut sheets or panels of glass in varied colors can be joined to form an ornament, such as a small vase or lamp for holding a candle, or a decorative "Tiffany" type lamp shade. One method, called the lead came method involves cutting the various colored glass panels accurately by using a pattern. Then the glass panels are laid flat, and each panel is wrapped around its perimetral edge with lead came. The lead came, which can be U-shaped or H-shaped in cross-section, is cut to length and tack-soldered around the glass panels. Each panel, with its surrounding came, is then stood on end and tack-soldered to adjacent camed panels. Then, the ends of the strip of thus-assembled panels are gradually bent into the shape of, for example, the vase, lamp or lamp shade and tack-soldered together. The angles between adjacent panels are not precisely equal. As a result, the final structure frequently will assume quite an unsymmetrical appearance, even though it was originally intended to be symmetric. Frequently, the glass panels will be loose in the cames, and it will be necessary to caulk the panels tightly into their cames. All of this results in a somewhat clumsy looking lamp shade or other structure.

The Tiffany method is frequently used to make a rather more elegant-appearing ornamental structure. The Tiffany method consists of cutting the glass panels, accurately, again by means of a pattern. The perimetral edge of each panel is then covered with a copper foil. The outside of the foil is tinned with solder. Adjacent foiled and tinned panels are then tack-soldered together using small amounts of solder at the top and bottom. The thus-assembled pairs of panels are then stood on end and formed into something intended to approximate closely the desired final shape. Finally, assembly is conducted by soldering inside and out between all the adjacent panels with a raised bead of solder. During the final soldering assembly, however, the structure is difficult to manage, and it is frequently impossible to retain the desired shape. Further, there is always the possibility of the copper foil pulling away from the perimeter of the glass panels during assembly. This possibility is increased because, inevitably, some bending of the structure is required to conform it to the desired shape. For these reasons, many craftsman and hobbyists are reluctant to use the Tiffany, or copper foil, method in making paneled ornaments, such as lamp shades.

It is an object of this invention to provide a tool for use in constructing such paneled ornaments which would save labor and ease construction. Such a tool would enable the user to solder completely the inside edges of adjacent foiled panels in one pass.

A further object of the invention is to provide a tool useful in assembling the panels in pairs.

According to the invention, the tool comprises a base or table providing a top surface, and a plurality of legs for supporting it. The top surface is provided with a pair of threaded holes disposed adjacent two opposite edges of the table. Preferably, such holes extend all the way through the top surface. The holes receive threaded adjusting bolts. Each bolt is provided with a locking device, or wing nut on the underside of the top surface. The wing nuts can be brought up tightly against the underside to lock the threaded shafts in position in their respective threaded holes.

At least one, and preferably a plurality, of locating pins project upwardly from the top surface of the table to provide locating points. Preferably, these pins are disposed in a line. First and second work surface providing means, or panels, provide first and second work surfaces, respectively, which include adjacent edges grooved to fit against the upwardly projecting pins, and surfaces resting against support means provided at the vertically upward ends of the threaded shafts. A predetermined, selectively variable angle is defined by this structure between the planes of the first and second work surfaces. That angle corresponds to the angle between adjacent panels which a particular ornamental structure is to have. If, for example, a structure is to be six-sided and equiangular, the angle between adjacent panels, and therefore between the first and second work surfaces, will be 120°. If the ornamental structure is to be twelve-sided and equiangular, the angle between adjacent panels will be 75°.

Since it is easier to measure the angle between each work surface and the top surface of the table, this angle may be used to calibrate the tool for construction of a particular ornament. For example, in the six-sided ornament case, the angle between each work surface and the table top surface will be 30°. To construct a twelve-sided ornament, the angle between each work surface and the table top surface will be 15°.

To assist in adjusting the supports for the work surfaces, four embodiments of the invention include gauge means. In a first embodiment, a chart is provided on the table top surface listing the number of degrees, and the corresponding distance for each support above the table top surface, for each number of sides of an equiangular ornament. The table is provided with a slot housing a ruler. The ruler is used to measure the distance from the table top surface to the supports in accordance with the chart.

In other embodiments, a gauge block is provided which has gauge marks or indices along its length. The gauge block is set flat upon the table top surface, or inserted into a well provided for that purpose in the table top surface, and the supports are moved upwardly by rotating the threaded shafts in their respective threaded holes until the supports reach predetermined distances, as indicated on the gauge block, above the table top surface. As with the first embodiment, a well is provided for storing the gauge block.

In another embodiment, a plurality of gauge blocks are provided. Each one has a dimension corresponding to one of the selected angles. The gauge blocks are used to adjust the heights of the supports above the table top surface in the same manner as the single block with calibrations. Individual wells are provided in the table for the various gauge blocks.

The invention may best be understood by referring to the following description and accompanying drawings which illustrate the invention. In the drawings:

FIG. 1 is a partly fragmentary perspective view of a first embodiment of the invention;

FIGS. 2-2a are partly fragmentary and sectional views of the apparatus of FIG. 1, taken generally along section lines 2—2 thereof;

FIG. 3 is a partly fragmentary sectional view of the tool of FIG. 1, taken along section lines 3—3 thereof;

FIG. 6 is a perspective view of a fourth embodiment of the inventive structure, with the work surface providing panels removed;

FIG. 7 is a sectional and fragmentary view showing a bevel useful with the tool of the present invention, undergoing adjustment; and, FIG. 8 is a view of the tool of FIG. 7 in use.

Figure 2A:
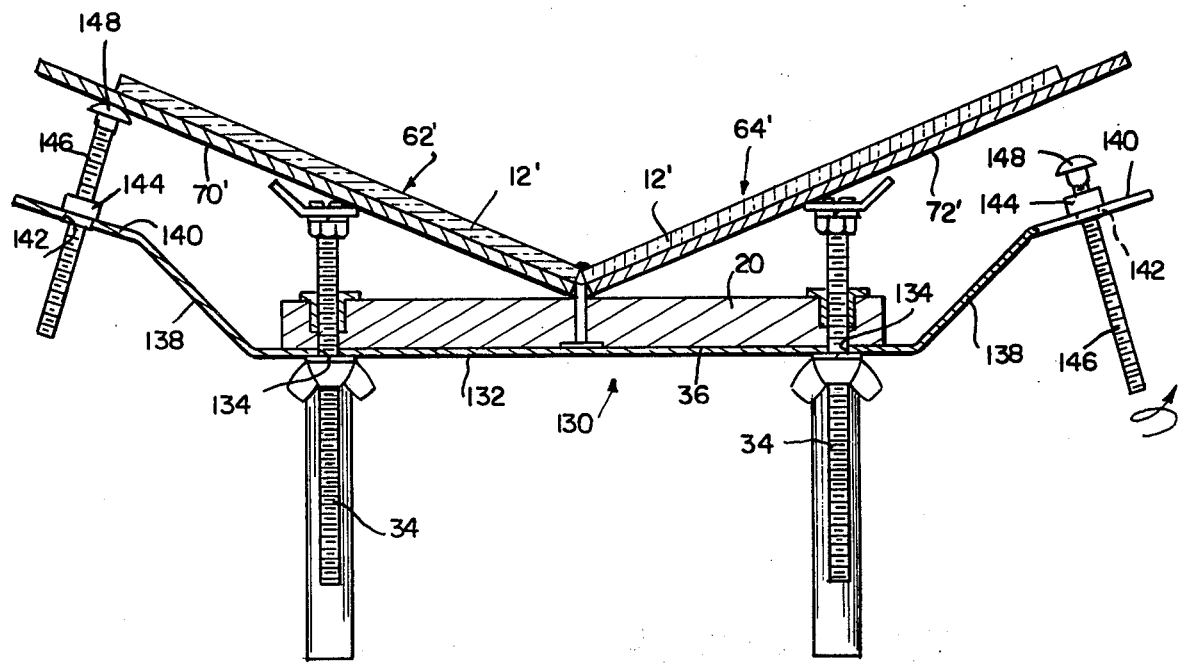

Referring now to FIGS. 1-3, a tool 10 for use in constructing ornaments and the like having panels 12 disposed at selected angles (illustratively 135°) with respect to one another, is illustrated. In the illustrative embodiment, the panels 12 have been wrapped about their perimeters 14 with strips of copper foil 16 to make an ornament, e.g., a lamp shade, using the Tiffany method.

The tool 10 comprises a base 20 of generally planar and rectangular configuration having a leg or post 22 attached to each corner 24. The legs 22 permit the base 20 to be elevated above the level of a surface upon which the base rests. The base 20 illustratively is constructed of pressboard, and is provided with apertures 26 located centrally adjacent to opposite longitudinal edges 28 thereof. Snug-fitting threaded inserts 30 are driven into the apertures 26 on the top surface 32 of the base 20. Inserts 30 threadably receive bolts 34 downwardly therethrough. The bolts 34 project beneath the bottom surface 36 of base 20. Each bolt 34 is provided with a wing nut 38 and lock washer 40 which are engageable with bottom surface 36 to position the bolts 34 vertically in their respective inserts 30.

The vertically upper ends 44 of bolts 34 are provided with slotted heads 46 which capture bar-like supports 48. The supports 48 are positioned on the vertically upper ends 44 by nuts 50 and lock washers 52 (FIG. 3), which are drawn up tightly against the supports 48. Each support 48 includes a generally planar horizontally extending portion 54 having an aperture 56 through which its respective bolt 34 passes, and a planar portion 58 inclined upwardly and outwardly from the planar portion 54 at an angle of, illustratively, 140°. It will be appreciated that the supports 48 are adjustable upwardly and downwardly to predetermined distances above top surface 32 by spinning the supports to run the bolts 34 upwardly and downwardly in their respective inserts 30. It will further be appreciated that each support 48 can be locked in place at a predetermined distance above top surface 32 by running its respective wing nut 38 and lock washer 40 against the bottom surface 36, binding its respective bolt 34 in its insert 30.

As best illustrated in FIG. 3, headed locating pins 60 protrude vertically upwardly from top surface 32. Referring to FIG. 2, a plurality of pins 60 are provided, and the pins are oriented generally along a straight line parallel to, and halfway between, edges 28. Tool 10 includes first and second work surface-providing panels 62, 64, respectively. Each panel 62, 64 includes a generally planar work surface 66, 68, respectively, and a generally planar underside 70, 72, respectively. Panels 62, 64 are generally identical in construction, each being generally rectangular in shape and having two parallel, opposite longitudinal edges 74. Each edge 74 is provided with three notches 76, spaced to correspond to the locations of pins 60.

In use, the inside angle between two adjacent panels 12 of an ornament being constructed is determined. The ornament may be equiangular, or regular, polygonal in section, or it may be irregular. Irregular polygonal ornaments will require that tool 10 be adjusted to different angles during the construction of the ornament. However, the adjustment itself will be no different than adjustment for a regular polygonal ornament. This being the case, adjustment for a regular polygonal ornament will be explained. Assuming that an equiangular eight-sided ornament, such as a Tiffany lamp shade, is to be constructed, it is first determined that the interior angles between adjacent panels of the ornament must be 135°. Thus, the angle between work surfaces 66, 68 must be 135°. It will, therefore, be appreciated that the angles between undersides 70, 72 and the adjacent top surface 32 of base 20 must be 22½°. For these angles to exist, the planar portions 54 of supports 48 must be adjusted upward from top surface 32 a predetermined distance. For the convenience of the user of tool 10, a chart 78 is printed on top surface 32 which indicates, for each number of panels in a regular polygonal ornament, the angle which must be made between surfaces 70, 72 and top surface 32 (assuming that these angles are to be equal) and the distance of supports 48 above surface 32 which corresponds to that angle. It should be understood that the angle in degrees listed on chart 78 is for equal inclinations of panels 62, 64. It is not essential that these angles be equal, since an infinite number of combinations of these two angles will provide the 135° internal angle between panels 12. The angles on the chart 78 are provided merely for the convenience of the user, and should not be considered limitative.

The supports 48 are adjusted upward by rotating them and their respective bolts 34 in inserts 30 to a distance above surface 32 corresponding to the selected angle (22½°). Panels 62, 64 are then positioned with notches 76 engaging their respective locating pins 60. Undersides 70, 72 rest against supports 48. With the tool adjusted properly, the angle between the planar work surfaces 66, 68 will be 135°. The nuts 38 and washers 40 are run up tightly against bottom surface 36 to lock the tool in this position. The panels 12, with their perimetral foil 16 are laid on surfaces 66, 68 and oriented with their edges 80 along one or the other of reference lines 82 provided on surfaces 66, 68. With the panels 12 in proper orientation, the panels are tacked together by soldering along the abutting foiled edges 84. After all of the eight panels have been joined in four pairs, the process may be continued on adjacent pairs to insure that the correct angles are provided between all of the adjacent panels 12.

After the soldering on the inside seams of the ornament is complete, the ornament is completed by filling the outer seams between panels 12 with solder. The ornament is rested in tool 10 and solder is deposited in the outer seams, one at a time. When the solder hardens, the ornament is turned and rested in the tool 10, again with an unfilled seam facing up. This procedure is repeated until each outside seam is filled with solder.

For the convenience of the user, the tool 10 is provided with a pocket 86 housing a rule 88 for measuring the distances between top surface 32 and supports 48.

Figure 5:
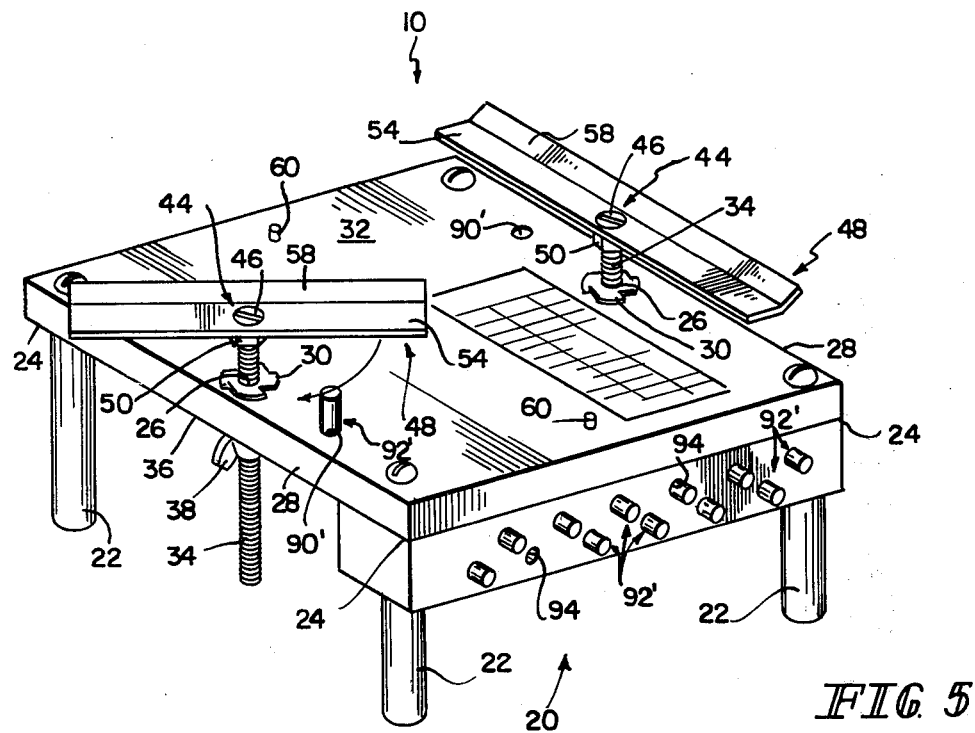
FIG. 5 is a perspective view of a third embodiment of the inventive structure, with the work surface providing panels removed.
Figure 4:
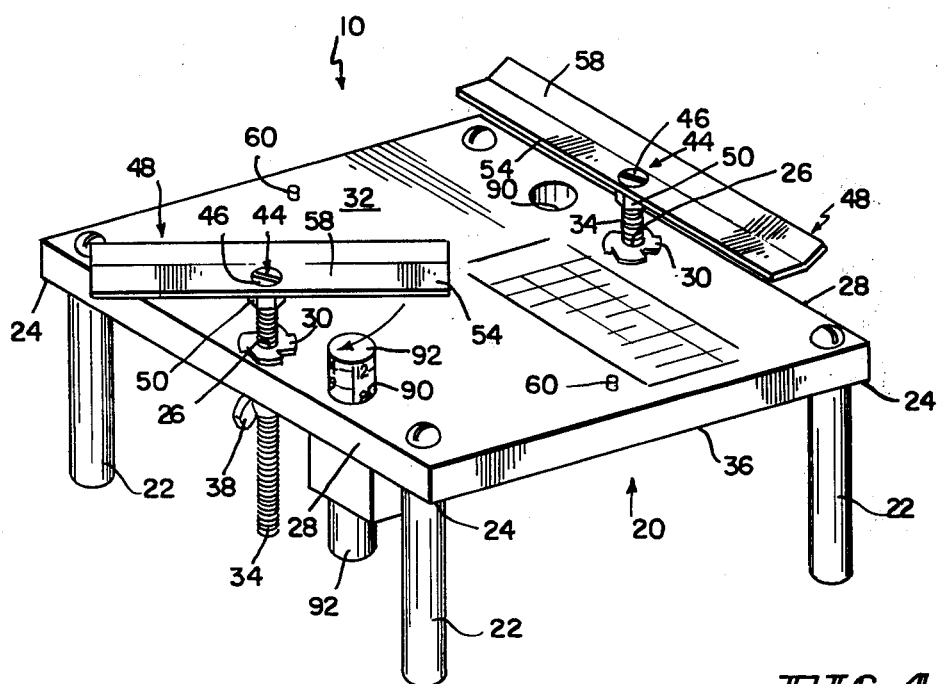
FIG. 4 is a perspective view of a second embodiment of the inventive structure, with the work surface providing panels removed.

In the additional embodiments, illustrated in FIGS. 4–6, those elements numbered identically to the embodiment in FIGS. 1–3 perform the same or similar functions. In the embodiments of the FIGS. 4–6, the panels 62, 64 have been removed for purposes of explanation.

In FIG. 4, the base 20 is provided with two wells, or passageways, 90. Passageways 90 are located beneath the positions assumed by supports 48 when they are in position to support respective panels 62, 64. A dowel-shaped gauge block 92 is provided for reasonably tight sliding insertion into passageways 90. Gauge block 92 is calibrated with numbers representative of the number of sides or panels 12 of a regular polygonal ornament. Block 92 is inserted first into one of passageways 90, and then into the other, to calibrate the distances between supports 48 and top surface 32, during the set-up of tool 10.

In FIG. 5, a plurality of gauge blocks 92' are provided. Each gauge block 92' has a length corresponding to a particular included angle between two adjacent panels 12 of an ornament being constructed. A selected block 92' is inserted first into one of the wells 90' to adjust one of supports 48, and then into the other well 90' to adjust the other support 48 during set-up of the tool 10 of FIG. 5. The tool in FIG. 5 is provided with a plurality of storage wells 94 for storing the individual gauge blocks 92' when the blocks are not in use.

In the embodiment of FIG. 6, a single gauge block 92" is used. Block 92" has a reduced-diameter extension 96 at its lower end. A well 90" is provided in the center of base 20 adjacent the center locating pin 60, for receiving extension 96. Gauge block 92" is provided with indices corresponding to the various numbers of sides, or panels 12, of a regular polygonal ornament. In this embodiment, supports 48 are rotated approximately 90° to check their heights above surface 32, and are then rotated back to their proper orientation to support panels 62, 64. The storage well 94" in this embodiment has the same diameter as well 90".

Returning to FIG. 3, it will be noted that when the included angle between panels 62, 64 reaches 140°, undersides 70, 72 will contact the edges of both portions 54, 58 of supports 48. When the included angle between panels 62, 64 exceeds 140°, the undersides 70, 72 of panel 62, 64 will contact only the edge of portion 58 of each support 48. Thus, the support point for each panel 62, 64 moves outward and away from the line of locating pins 60 when the number of sides, or panels 12, of an ornament reaches or exceeds nine. This is done to provide additional stability for structures having large number of sides, and to prevent interference of the bolt 34 heads 46 with the undersides 70, 72. The figure of 140° is, of course arbitrary. Other orientations may be used, depending upon individual considerations.

FIGS. 7–8 disclose a bevel useful in maintaining the exterior angles of ornaments while exterior soldering is done. In FIG. 8, the bevel 100 is shown in use holding the exterior angles of a small, regular pentagonal ornament 101 such as a candle holder. It is known that each exterior angle should be 108°. To avoid having the user adjust the bevel 100 with a protractor, a chart 102 is provided on one leg 104 of the bevel 100. The chart includes information relating to the number of panels of a regular polygonal ornament, the number of degrees externally between adjacent panels 12 of the ornament and a distance, illustratively in inches. The distance is set between a notch 106 provided in leg 104 of the bevel 100 and a point 108 provided on the other leg 110 of bevel 100. The two legs are pivotally connected about a shaft 112, and adjustable by loosening a wing nut 114 provided on shaft 112. Nut 114 is tightened to lock legs 104, 110 in a desired orientation. Leg 104 is generally U-shaped in longitudinal section to provide a storage slot 116 for leg 110, when the legs are folded together. Leg 104 is also provided with a stop 118 which permits leg 110 to be rotated out of the slot 116 in the counter-clockwise direction only, as illustrated in FIGS. 7–8.

It should be noted that, since panels 62, 64 are identical, they may be reversed and inverted as necessary as they become worn. It should be further appreciated that the charts showing numbers of panels, angular orientations and distances as described can be printed on the surfaces 66, 68, 70, 72 as desired for the convenience of the user. Alternatively, papers may be printed with the charts and reference lines 82. The papers may be folded with a V-shaped crease and laid in the angle provided by surfaces 66, 68. Such papers would protect surfaces 66, 68 from, for example, solder or soldering flux, and also provide the necessary reference lines 82 and angle-and-distance charts 78.

Referring now to FIG. 2a, those elements numbered identically to elements in FIGS. 1–3 perform the same or similar functions.

When panels 12' are being assembled which are quite wide, they may extend outwardly beyond the supports 48. This condition is illustrated in FIG. 2a. As a result, the panels 62, 64 may not be sufficiently wide to hold two such panels 12' in stable orientations so that their adjacent edges may be soldered. For this purpose, two somewhat wider panels 62', 64' are provided. These panels 62', 64' extend well beyond the supports 48. To provide stability for the panels 62', 64' beyond the supports 48, a metal bracket 130 is provided. Bracket 130 has a flat central portion 132 with holes 134 spaced apart longitudinally to receive the downwardly extending ends of bolts 34, and be captured against the bottom surface 36 of base 20 by wing nuts 38 and lock washers 40. Bracket 130 includes portions 138 at each end of central portion 132. Portion 138 illustratively are bent upwardly at angles of approximately 45°. Bracket 130 further includes portions 140 provided at the outer ends of portions 138. Portions 140 illustratively are inclined downwardly with respect to portions 138 at angles of approximately 30°. Each portion 140 includes a centrally located opening 142 provided with a press-fitted internally threaded member 144. Each threaded member 144 supports a bolt 146 having a head 148.

In use, the panels 62', 64' are positioned on the locating pins 60 in the same manner as panels 62, 64 in the embodiment of FIGS. 1–3. Bolts 146 are then threaded upwardly in their inserts 144 until heads 148 contact the undersides 70', 72' of the panels 62', 64'. This contact provides the additional support necessary to support the extra-wide ornament panels 12' securely.

What is claimed is:

1. A tool for use in constructing ornaments and the like having panels disposed at a selected angle with respect to one another, and means for attaching said panels together to maintain said angle, the tool comprising a base, means for providing a first work surface defining a first plane, means for selectively adjustably positioning the first work surface in a tilted orientation with respect to the base including a threaded shaft, means threadably receiving the threaded shaft, means for mounting the threadable receiving means on the base, means for locking the threaded shaft in a selected position with respect to the threadable receiving means, and for maintaining said tilted orientation, and means for providing a second work surface defining a second plane, the first plane intersecting the second plane at substantially said selected angle, means for selectively adjustably positioning the second work surface in a tilted orientation with respect to the base, and for maintaining said tilted orientation, the tilted orientations of the first and second work surfaces cooperating to create said selected angle between said first and second planes, support means including a bar fixed to the vertically upper end of its respective threaded shaft, the bar including a generally flat horizontal portion and an upwardly inclined generally flat portion, the flat portions of the bar making approximately 140° angles with respect to each other.

2. A tool for use in constructing ornaments and the like having panels disposed at a selected angle with respect to one another, and means for attaching said panels together to maintain said angle, the tool comprising a base, means for providing a first work surface defining a first plane, means for selectively adjustably positioning the first work surface in a tilted orientation with respect to the base, and for maintaining said tilted orientation, and means for providing a second work surface defining a second plane, the first plane intersecting the second plane at a substantially said selected angle, and means for mounting the second work surface on the base, the means for mounting the second work surface on the base comprising means for selectively adjustably positioning the second work surface in a tilted orientation with respect to the base, and for maintaining said tilted orientation, the tilted orientations of the first and second work surfaces cooperating to create said selected angle between said first and second planes, each said selectively adjustable positioning means including a threaded shaft, means threadably receiving the threaded shaft, means for mounting the threadable receiving means on the base, means for locking the threaded shaft in a selected position with respect to the threadable receiving means, and support means at a vertically upper end of the threaded shaft to support the respective first and second work surfaces in their respective tilted orientations, the base including a generally flat horizontal upper surface through which the threaded shafts adjustably extend, the threadable receiving means comprising threaded passageways extending generally vertically into the generally flat horizontal upper surface, the generally flat horizontal upper surface of the base being provided with at least one locating means for providing a reference location on said base surface, and means on each of said first and second work surface-providing means for cooperating with the locating means to locate each said first and second work surface-providing means relative to said reference location, each said locating means including a pin which extends generally vertically upwardly from said base surface, each said work surface providing means including an edge for cooperating with the corresponding edge on the other work surface-providing means to form said intersection of said first and second planes, and said cooperating means on each said work surface-providing means including a groove in each said cooperating edge for location of said pin therein.

3. A tool for use in constructing ornaments and the like having panels disposed at a selected angle with respect to one another, and means for attaching said panels together to maintain said angle, the tool comprising a base, means for providing a first work surface defining a first plane, means for selectively adjustably positioning the first work surface in a tilted orientation with respect to the base, and for maintaining said tilted orientation, and means for providing a second work surface defining a second plane, the first plane intersecting the second plane at substantially said selected angle, and means for mounting the second work surface on the base, the means for mounting the second work surface on the base comprising means for selectively adjustably positioning the second work surface in a tilted orientation with respect to the base, and for maintaining said tilted orientation, the tilted orientations of the first and second work surfaces cooperating to create said selected angle between said first and second planes, each said selectively adjustable positioning means including a threaded shaft, means threadably receiving the threaded shaft, means for mounting the threadable receiving means on the base, means for locking the threaded shaft in a selected position with respect to the threadable receiving means, and support means at a vertically upper end of the threaded shaft to support the respective first and second work surfaces in their respective tilted orientations, said selectively adjustable positioning means further comprising additional threaded shafts having additional support means provided at their vertically upper ends, a bracket, means for attaching the bracket to the base to extend outwardly from the base adjacent each said means for threadably receiving a threaded shaft, and means on the bracket for threadably receiving said additional threaded shafts to permit adjustment of the additional threaded shafts to move the additional support means into supporting relation with the first and second work surfaces in their respective tilted orientations.

4. A tool for use in constructing ornaments and the like having panels disposed at a selected angle with respect to one another, and means for attaching said panels together to maintain said angle, the tool comprising a flat-topped base, means for providing a first flat work surface defining a first plane for receiving and supporting a first one of such panels, means for selectively adjustably positioning the first work surface in a tilted orientation with respect to the base, and for maintaining said tilted orientation, and means for providing a second flat work surface defining a second plane for receiving and supporting a second one of such panels, means for selectively adjustably positioning the second work surface in a tilted orientation with respect to the base, and for maintaining said tilted orientation, the tilted orientations of the first and second work surfaces cooperating to create said selected angle between said first and second planes, said selectively adjustable positioning means including first and second threaded shafts, means provided on the base for threadably receiving the threaded shafts such that the shafts project upwardly from the flat top of the base, means for locking the threaded shafts in selected positions with respect to their respective threadable receiving means, and support means at a vertically upper end of the first and second threaded shafts to support the respective first and second work surfaces in their respective tilted orientations, with the first and second flat work surfaces making said selected angle with each other.

5. The tool of claim 4 wherein the generally flat top of the base is provided with at least one locating means for providing a reference location on the flat top surface of said base, and means are provided on each of said first and second work surface-providing means for cooperating with the locating means to locate each said first and second work surface-providing means relative to said reference location.

6. The tool of claim 5 wherein a plurality of such locating means are positioned on said base surface.

7. The tool of claim 6 wherein said plurality of locating means are positioned generally in a straight line.

8. The tool of claim 7 wherein each said locating means comprises a pin which extends generally vertically upward from said base surface, each said work surface-providing means including an edge for cooperating with a corresponding edge of the other work surface-providing means to form an intersection of said first and second planes, and said cooperating means on each said work surface-providing means including a groove in each said cooperating edge for location of each said pin therein.

9. The tool of claim 4 and further comprising means for gauging the tilted orientations of the work surface-providing means.

10. The tool of claim 9 wherein the gauging means comprises a guage block removably mounted on the base and provided with a plurality of gauge marks corresponding to desired angles, the threaded shafts and support means being adjusted upwardly from the base in amounts determined by said gauge marks and corresponding to said desired angles.

11. The tool of claim 9 wherein the gauging means comprises a ruler and means providing a gauge table with distances corresponding to desired angles, the threaded shafts and support means being adjusted upwardly selected distances corresponding to said desired angles.

12. The tool of claim 4 and further comprising means providing a reference or starting mark on at least one of said work surfaces.

13. The tool of claim 12 wherein said mark is a line extending across said at least one work surface.

14. The tool of claim 13 wherein a plurality of such reference lines are provided on said at least one work surface.

15. The tool of claim 14 wherein such reference lines are provided on both of said work surfaces.

* * * * *